O. M. ROBINSON.
Hold-Back for Vehicles.
No. 201,125.          Patented March 12, 1878.
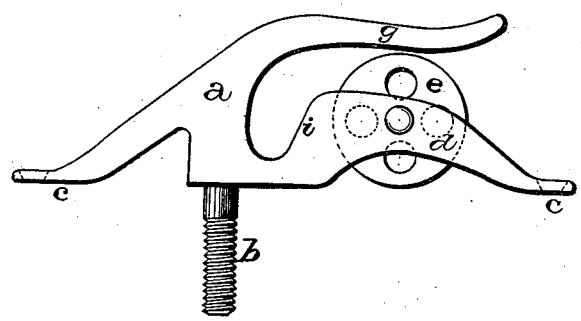
Witnesses:
J. W. Garner
W. S. D. Haines
Inventor:
O. M. Robinson,
per
F. A. Lehmann,
Atty.

UNITED STATES PATENT OFFICE.

ORVILL M. ROBINSON, OF UPPER JAY, NEW YORK.

IMPROVEMENT IN HOLDBACKS FOR VEHICLES.

Specification forming part of Letters Patent No. 201,125, dated March 12, 1878; application filed February 2, 1878.

*To all whom it may concern:*

Be it known that I, ORVILL M. ROBINSON, of Upper Jay, in the county of Essex and State of New York, have invented certain new and useful Improvements in Holdbacks for Vehicles; and I do hereby declare the following to be a full, clear, and exact description of the invention, such as will enable others skilled in the art to which it pertains to make and use it, reference being had to the accompanying drawing, which forms part of this specification.

My invention relates to an improvement in holdbacks for vehicles; and it consists in the arrangement and combination of parts that will be more fully described hereinafter, whereby a cheap, simple, and effective holdback is produced, and one in which the rubber roller will act as effectually in cold weather as in any other.

The accompanying drawing represents my invention.

$a$ represents the holdback-hook, which is provided with a screw, $b$, for securing it to the shaft, and the two bearing-points $c$ at opposite ends, which rest upon the shaft, and through which screws or bolts are passed. By thus having a screw or its equivalent device for holding the hook near the center, and the two bearing-points, as shown, the holdback will be held so firmly and securely in position that it cannot work loose or get out of position in any manner.

The lower prong $d$ of the hook has a slot cut through it, and in this slot is journaled a perforated roller, $e$. The upper edge of this roller extends upward, so as to be almost in contact with the under side of the upper prong $g$. This prevents the holdback-strap from coming out of the hook. This roller is made perforated, as here shown, for the purpose of making the roller readily yield, and be as elastic in cold as in warm weather.

The great trouble with solid rubber rollers is, that during the winter they freeze, and become so solid that they will not answer for the purpose for which they are intended, and my invention is intended to overcome this defect.

Just back of the slot in which the roller turns is formed the shoulder $i$, against which the holdback-strap will wear, and thus the shoulder acts as a guard for the rubber, and prevents it from being worn or injured.

I am aware that a piece of rubber tubing has been used to prevent the ring on the holdback-strap from coming out of the hook, and this I disclaim.

Having thus described my invention, I claim—

1. In combination with the holdback, a perforated rubber roller, substantially as shown.

2. The combination of the holdback $a$, provided with the screw $b$, bearing-points $c$, perforated rubber roller $e$, and shoulder $i$, substantially as shown and described.

In testimony that I claim the foregoing I have hereunto set my hand this 28th day of January, 1878.

ORVILL M. ROBINSON.

Witnesses:
  LUCINDA W. STICKNEY,
  MINERVA S. THAYER.